(12) United States Patent
Lin (10) Patent No.: US 9,687,397 B1
(45) Date of Patent: Jun. 27, 2017

(54) ELECTRIC WHEELCHAIR WITH QUICK-RELEASE DRIVE WHEELS

(71) Applicant: Chung-Chuan Lin, Taichung (TW)

(72) Inventor: Chung-Chuan Lin, Taichung (TW)

( * ) Notice: Subject to any disclaimer, the term of this patent is extended or adjusted under 35 U.S.C. 154(b) by 0 days.

(21) Appl. No.: 15/164,814

(22) Filed: May 25, 2016

(51) Int. Cl.
*A61G 5/04* (2013.01)
*A61G 5/10* (2006.01)
*B60K 1/02* (2006.01)
*B60B 37/06* (2006.01)

(52) U.S. Cl.
CPC .............. *A61G 5/10* (2013.01); *B60B 37/06* (2013.01); *B60K 1/02* (2013.01); *A61G 2005/1083* (2013.01); *B60Y 2200/84* (2013.01)

(58) Field of Classification Search
CPC ........ A61G 5/10; A61G 5/1083; B60B 37/06; B60Y 2200/84
See application file for complete search history.

(56) References Cited

U.S. PATENT DOCUMENTS

| 4,679,862 A * | 7/1987 | Luo | A61G 5/10 |
| | | | 301/112 |
| 4,768,797 A * | 9/1988 | Friedrich | A61G 5/08 |
| | | | 280/250.1 |
| 5,791,672 A * | 8/1998 | Masclet | A61G 5/02 |
| | | | 280/250.1 |
| 2005/0012303 A1 * | 1/2005 | Hargroder | A61G 5/10 |
| | | | 280/304.1 |
| 2014/0013891 A1 * | 1/2014 | Malm | A61G 5/023 |
| | | | 74/473.13 |

* cited by examiner

*Primary Examiner* — Brian Swenson
(74) *Attorney, Agent, or Firm* — Bruce Stone LLP; Joseph Bruce (57) ABSTRACT

An electric wheelchair with quick-release drive wheels includes: a chassis, and two guide wheels and two said drive wheels. The drive wheels are rotated by a drive mechanism and connected to the drive mechanism by a quick-release mechanism. To detach the drive wheel, the user can press the cover to make the rolling balls move out of the receiving groove and back to the arc-shaped engaging portion, which allows the hollow shaft to disengage from the drive shaft. Then, keeping pressing the cover can detach the drive wheel from the drive mechanism. To assemble the drive wheel, the user can press the hollow shaft into the axial hole to make the rolling balls engage in the receiving groove, so that the drive wheel is assembled to the drive mechanism. The assembly and disassembly of the drive wheel require no wrenches or other tools, and therefore are very convenient.

6 Claims, 8 Drawing Sheets

ELECTRIC WHEELCHAIR WITH QUICK-RELEASE DRIVE WHEELS

BACKGROUND

Field of the Invention

The present invention relates to an electric wheelchair, and more particularly to an electric wheelchair with quick-release drive wheels.

Related Prior Art

With the development of the society, livelihood protection and life quality of the disabled and elderly have attracted attention from all walks of life. The disabled and the elderly usually use wheelchairs as means of transport to improve their daily mobility, and wheelchairs are gradually changing over from manual wheelchairs to electric wheelchairs. Currently, there are various types of electric wheelchairs with different functions. However, there are still certain disadvantages in actual practice: the existing electric wheelchairs are designed as integral constructions, cannot be detached, large and heavy, and inconvenient to carry, especially when the user needs to see a doctor or to travel by a sedan. The drive wheels normally have a large diameter, which makes the size of wheelchairs too large to put into the trunk of a sedan.

The present invention has arisen to mitigate and/or obviate the afore-described disadvantages.

SUMMARY

The present invention is aimed at providing an electric wheelchair with quick-release drive wheels in accordance with the preferred embodiment of the present invention.

Therefore, an electric wheelchair with quick-release drive wheels in accordance with the present invention comprises: a chassis, and two guide wheels and two said drive wheels attached to the chassis, wherein the drive wheels are driven to rotate by a drive mechanism mounted on the chassis and connected to the drive mechanism by a quick-release mechanism, the quick-release mechanism includes a hollow shaft, and a lock nut screwed at an outer end of the hollow shaft, a shaft core is slidably disposed in the hollow shaft, a cover is screwed on an outer thread at an outer end of the shaft core, the shaft core includes a shoulder onto which a spring is disposed to push against the cover, an inner end of the shaft core is formed with an arc-shaped engaging portion in the form of a groove in which there are at least two rolling balls, the hollow shaft is formed with a positioning hole for positioning the rolling balls, the drive mechanism includes a drive shaft which is provided with an axial hole for insertion of the hollow shaft, a receiving groove for receiving the rolling balls is formed at one end of the axial hole, the drive wheel includes a hub which is provided with a shaft sleeve which is located at one of the hub adjacent to the drive mechanism, an engaging sleeve is provided at an outer end of the drive shaft, the hollow shaft is inserted through the hub and into the drive shaft in such a manner that the rolling balls project out of the positioning hole and engage in the receiving groove, so as to connect the shaft sleeve to the engaging sleeve, and as a result, the drive mechanism is able to rotate the drive wheel.

Preferably, the axial hole of the drive shaft is further provided with an engaging groove for engaging with the rolling balls, when the rolling balls are engaged in the engaging groove, the shaft sleeve is detached from the engaging sleeve, and the drive wheel rotates idly with respect to the drive mechanism.

Preferably, the shaft sleeve is provided at an end surface thereof with a plurality of equidistantly spaced engaging blocks for engaging with corresponding engaging portions formed on an end surface of the engaging sleeve, and a distance between the engaging groove and the receiving groove is larger than a thickness of the engaging blocks.

Preferably, the chassis is provided with a footrest which is disposed at the front end of the chassis and located between the two guide wheels.

Preferably, two anti-tipping wheels are disposed at the rear end of the chassis and located behind the two drive wheels.

Preferably, a hand wheel is fixed to an outer peripheral edge of the drive wheel.

When the user goes out or for other reasons and needs to detach the drive wheel, he can press the cover to push the shaft core to move within the axial hole, which makes the rolling balls move out of the receiving groove and back to the low point of the arc-shaped engaging portion, and consequently, the hollow shaft is allowed to disengage from the drive shaft. At this moment, keeping pressing the cover can easily detach the drive wheel from the drive mechanism, making it easy to put the wheelchair into a sedan's trunk for easy transport. To assemble the drive wheel back to the wheelchair, the user can simply press the hollow shaft into the axial hole of the drive shaft to make the rolling balls engage in the receiving groove again, so that the drive wheel is assembled to the drive mechanism. The assembly and disassembly of the drive wheel do not require the use of wrenches or other tools, and therefore are very convenient.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Referring to FIGS. 1-8, an electric wheelchair with quick-release drive wheels in accordance with the preferred embodiment of the present invention, comprises: a chassis 1, two guide wheels 2 disposed at a front end of the chassis 1, and two drive wheels 3 disposed at a rear end of the chassis 1. For simplicity purpose, only one drive wheel 3 will be described. The drive wheel 30 is driven to rotate by a drive mechanism 4 mounted on the chassis 1, and connected to the drive mechanism 4 by a quick-release mechanism 5. The quick-release mechanism 5 includes a hollow shaft 51, and a lock nut 52 screwed at an outer end of the hollow shaft 51 to adjust the tightness of the quick-release mechanism 5 and the drive wheel 3. A shaft core 53 is slidably disposed in the hollow shaft 51 and provided with an outer thread at an outer end thereof for fixing a cover 54. The shaft core 53 is provided with a shoulder onto which a spring 55 is disposed to push against the cover 54. An inner end of the shaft core 53 is formed with an arc-shaped engaging portion 531 in the form of a groove in which there are at least two rolling balls 56. The hollow shaft 51 is formed with a positioning hole for positioning the rolling balls 56. The drive mechanism 4 includes an electric drive motor and a gearbox. The gearbox includes a drive shaft 41 which is provided with an axial hole 410 for insertion of the hollow shaft 51. At one end of the axial hole 410 is formed a receiving groove 411 for receiving the rolling balls 56. The drive wheel 3 includes a hub 31 which is provided with a shaft sleeve 32. The shaft sleeve 32 is located at one of the hub 31 adjacent to the drive mechanism 4, and fixed to the hub 31 by bolts. At an outer end of the drive shaft 41 is provided an engaging sleeve 42. The hollow shaft 51 is inserted through the hub 31 and into the drive shaft 41 in such a manner that the rolling balls 56 project out of the positioning hole and engage in the receiving groove 411, so as to connect the shaft sleeve 32 to the engaging sleeve 42, and as a result, the drive mechanism 4 can rotate the drive wheel 3. When the user goes out or for other reasons and needs to detach the drive wheel 3, he can press the cover 54 to push the shaft core 53 to move within the axial hole 410, which makes the rolling balls 56 move out of the receiving groove 411 and back to the low point of the arc-shaped engaging portion 531, and consequently, the hollow shaft 51 is allowed to disengage from the drive shaft 41. At this moment, keeping pressing the cover 54 can easily detach the drive wheel 3 from the drive mechanism 4, making it easy to put the wheelchair into a sedan's trunk for easy transport. To assemble the drive wheel 3 back to the wheelchair, the user can simply press the hollow shaft 51 into the axial hole 410 of the drive shaft 41 to make the rolling balls 56 engage in the receiving groove 411 again, so that the drive wheel 3 is assembled to the drive mechanism 4. The assembly and disassembly of the drive wheel 3 do not require the use of wrenches or other tools, and therefore are very convenient.

Figure 7:
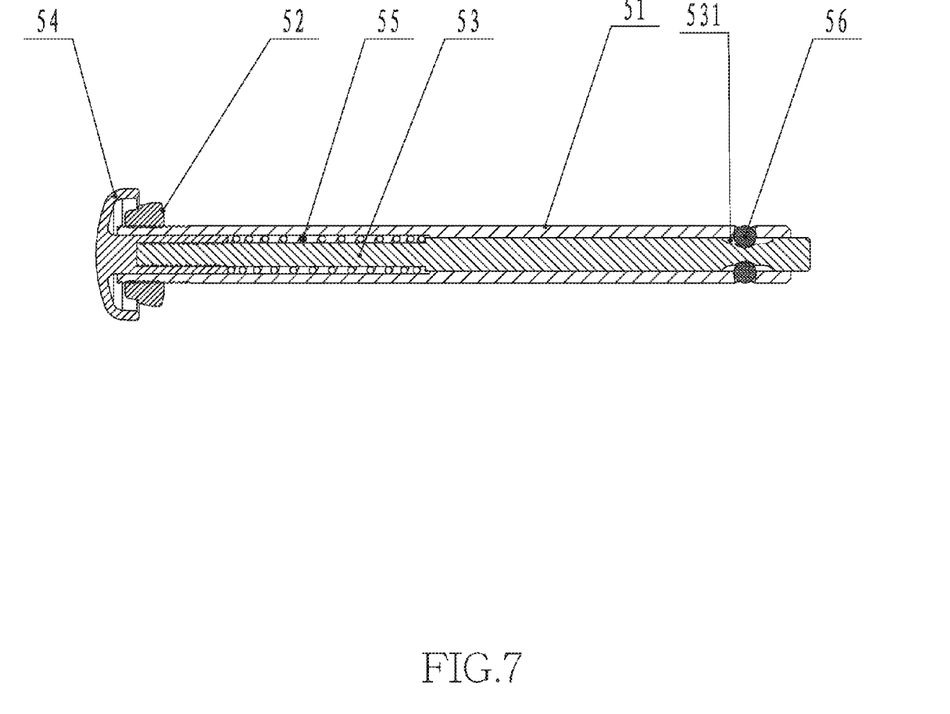
FIG. 7 is a cross sectional view showing a manual driven mode of the quick-release mechanism in accordance with the preferred embodiment of the present invention.
Figure 8:
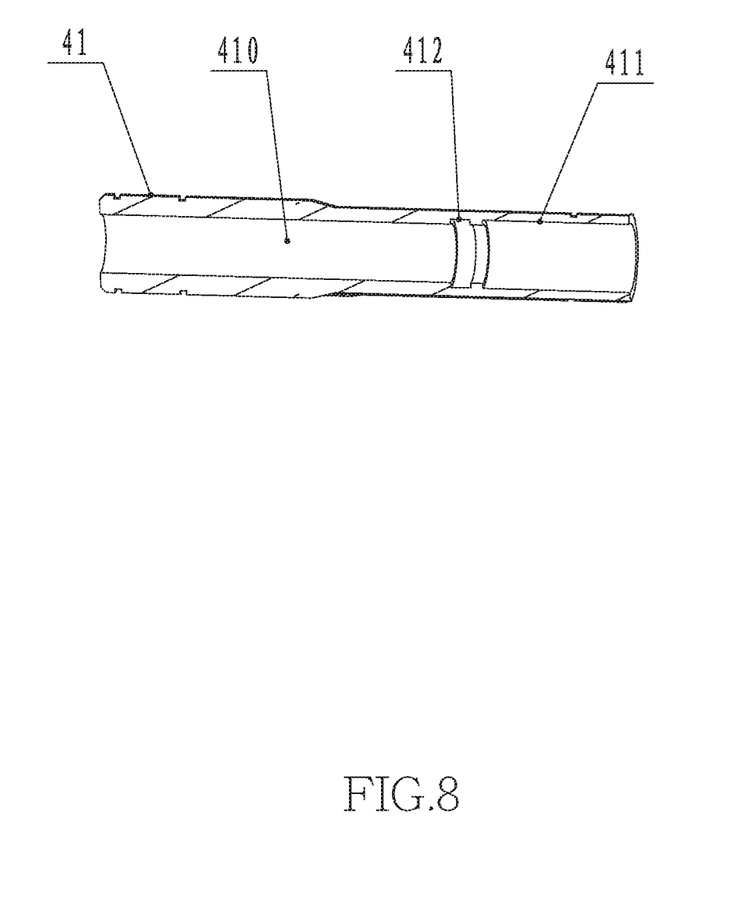
FIG. 8 a cross sectional view of a drive shaft of the electric wheelchair in accordance with the preferred embodiment of the present invention.

The axial hole 410 of the drive shaft 41 is further provided with an engaging groove 412 for engaging with the rolling balls 56, and the engaging groove 412 is located in front of the receiving groove 411. When the rolling balls 56 are engaged in the engaging groove 412, the shaft sleeve 32 is detached from the engaging sleeve 42, and the drive wheel 3 rotates idly with respect to the drive mechanism 4. With the engaging groove 412 located in front of the receiving groove 411, the user can manually rotate the wheelchair simply by pressing the cover 54 to push the shaft core 53 to move within the axial hole 410, which makes the rolling balls 56 move out of the receiving groove 411 and back to the low point of the arc-shaped engaging portion 531, then the user pulls the drive wheel 3 outward a certain distance to make the shaft sleeve 32 disengage from the engaging sleeve 42, then releases the cover 54 to make the rolling balls 56 engage in the engaging groove 412 again. At this moment, the drive wheel 3 is still connected to but can rotate idly with respect to the drive mechanism 4, so that the user can rotate the drive wheel 3 by manual, which allows the user to switch the wheelchair between manual and electric drive modes, enriching the functions of the wheelchair and improving the user's experience. Preferably, the drive wheel 3 is provided with a hand wheel 33 which is fixed to the outer peripheral edge of the drive wheel 3, so that, in the manual drive mode, the user can move the wheelchair by rotating the hand wheel 33.

The shaft sleeve 32 is provided at an end surface thereof with a plurality of equidistantly spaced engaging blocks 321 for engaging with corresponding engaging portions formed on an end surface of the engaging sleeve 42. A distance between the engaging groove 412 and the receiving groove 411 is larger than a thickness of the engaging blocks 321, so that, when in the manual drive mode, there is enough distance between the shaft sleeve 32 and the engaging sleeve 42 to prevent interference or mutual collision therebetween. The engagement of the engaging blocks 321 with the engaging portions secures connection between the shaft sleeve 32 and the engaging sleeve 42, and ensures smooth power transmission from the drive mechanism 4 to the drive wheel 3 during movement of the wheelchair. The cooperation of the engaging blocks 321 and the engaging portions also facilitates the assembling operation, and the shaft sleeve 32 can be easily assembled onto the engaging sleeve 42 simply by aligning the engaging blocks 321 with the engaging portions.

Figure 1:
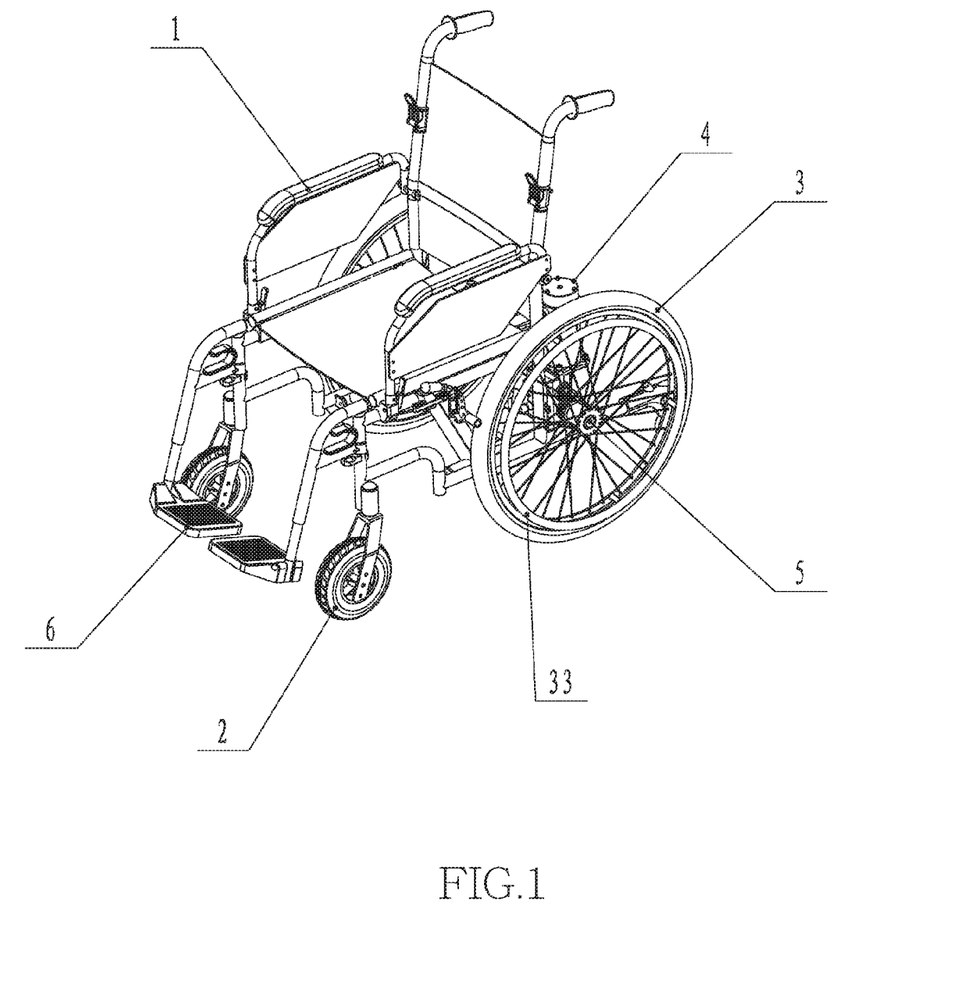
FIG. 1 is a perspective view of an electric wheelchair with quick-release drive wheels in accordance with a preferred embodiment of the present invention.
Figure 2:
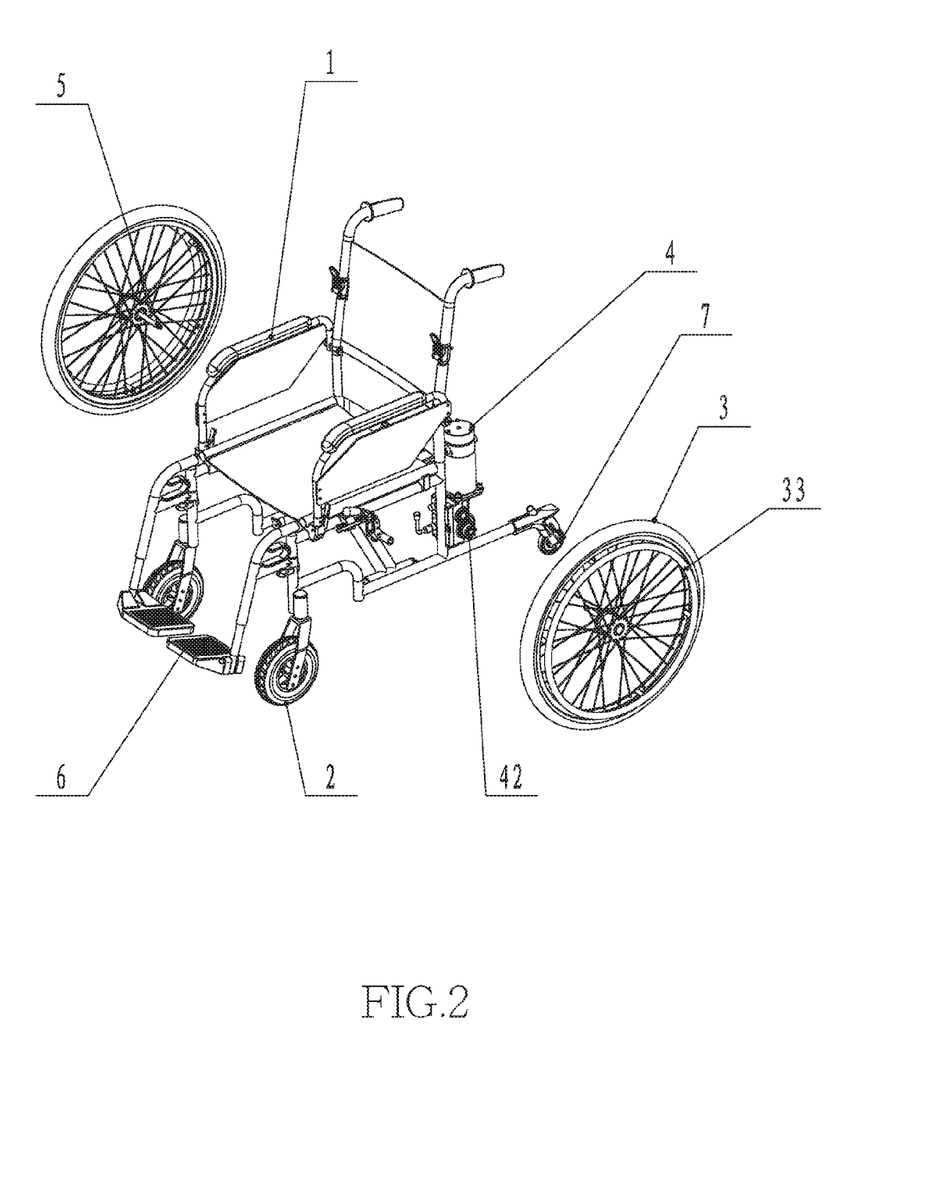
FIG. 2 is an exploded view of the electric wheelchair with quick-release drive wheels in accordance with the preferred embodiment of the present invention.
Figure 3:
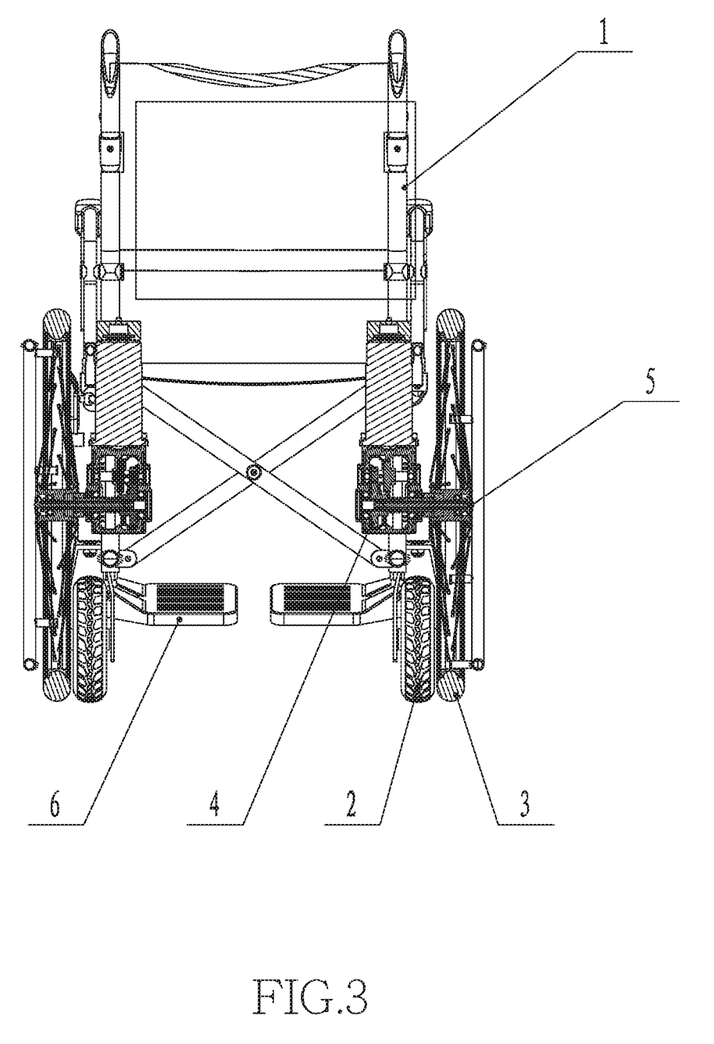
FIG. 3 is a cross sectional view of the electric wheelchair with quick-release drive wheels in accordance with the preferred embodiment of the present invention.
Figure 4:
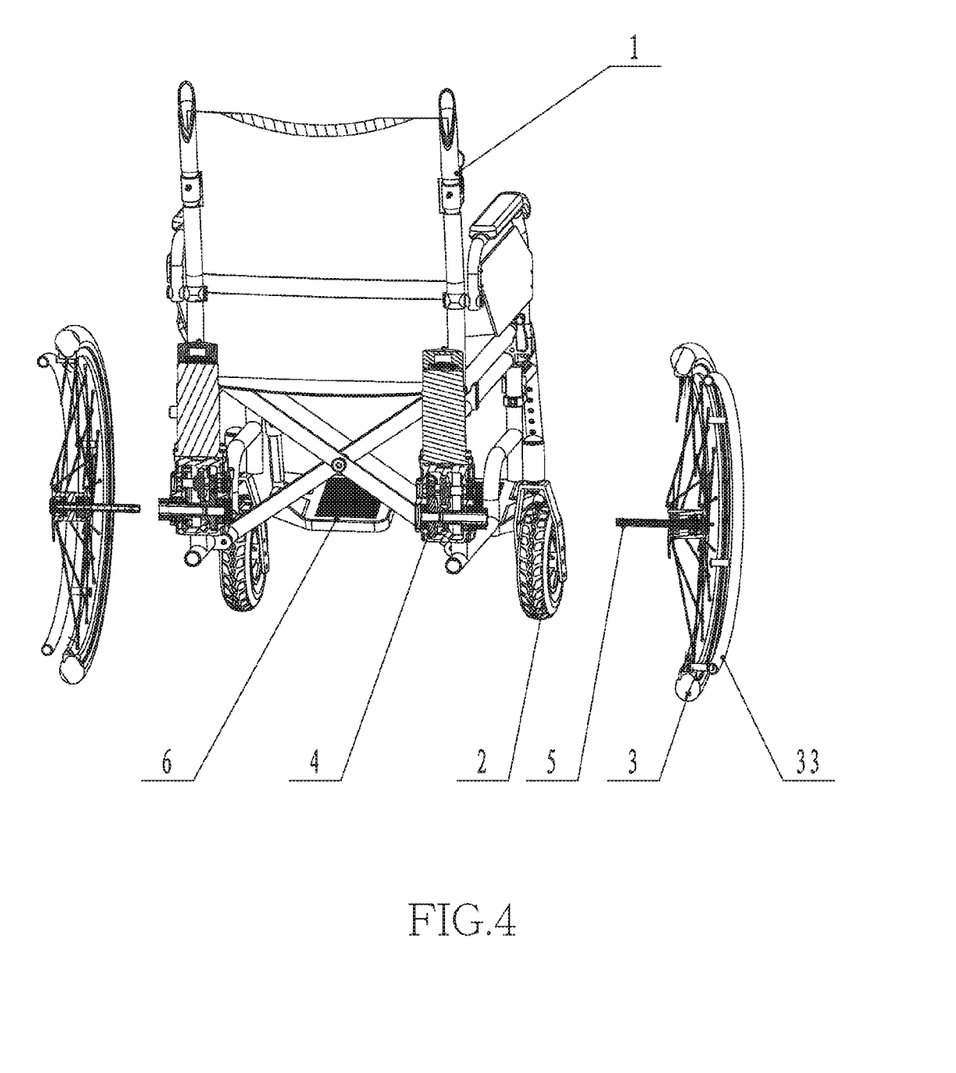
FIG. 4 is another exploded view of the electric wheelchair with quick-release drive wheels in accordance with the preferred embodiment of the present invention.
Figure 5:
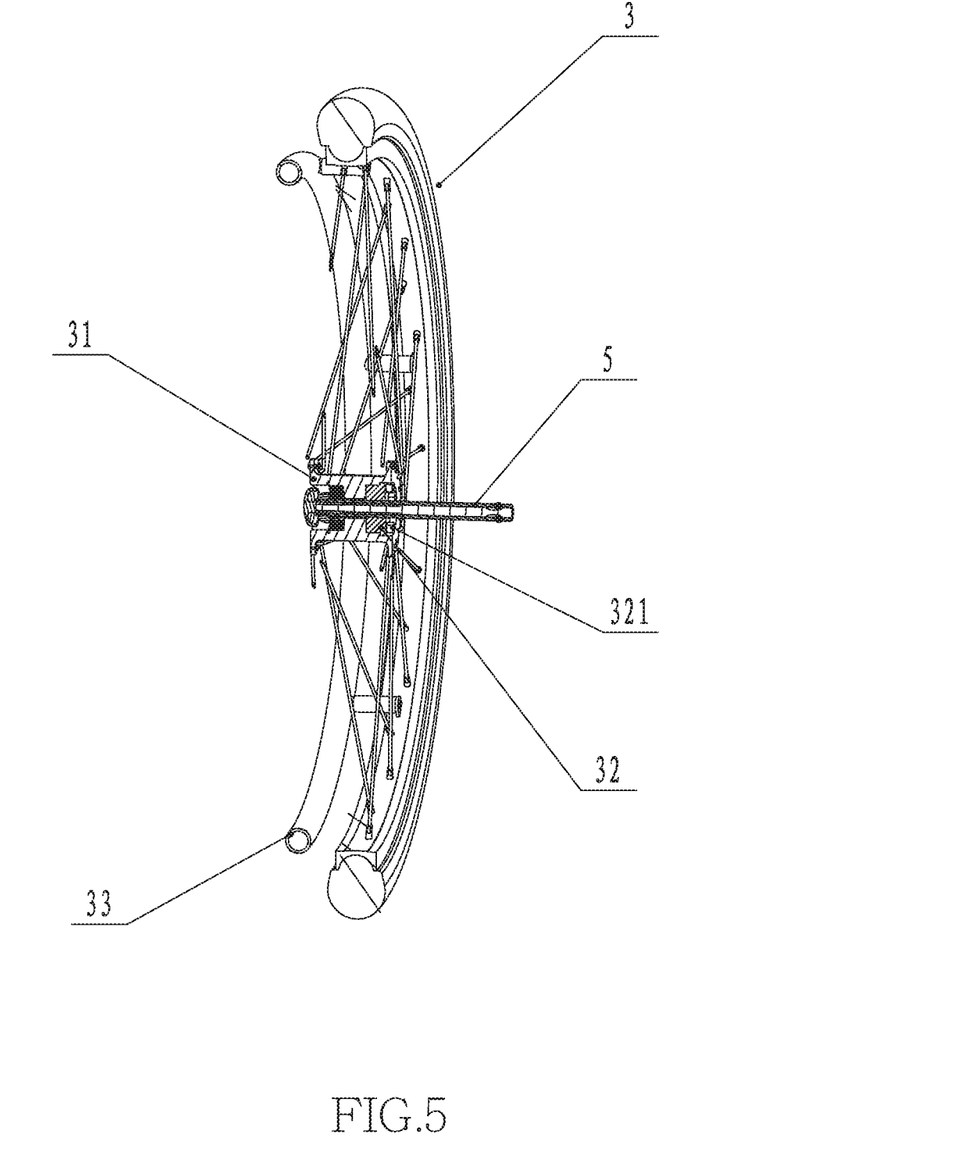
FIG. 5 is a cross sectional view of the drive wheel of the electric wheelchair in accordance with the preferred embodiment of the present invention.
Figure 6:
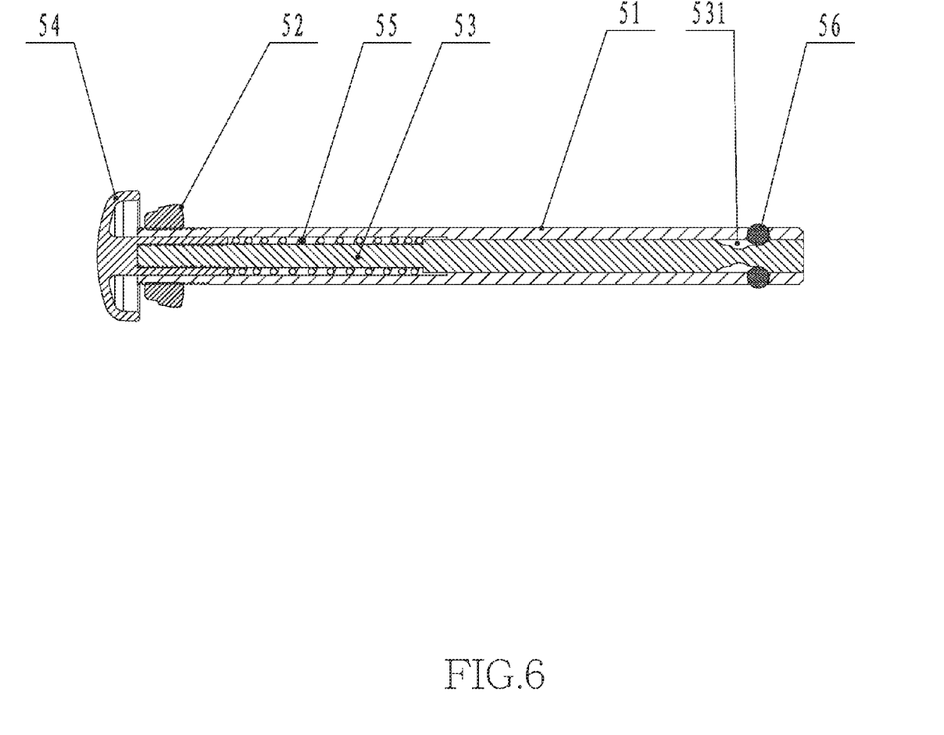
FIG. 6 is a cross sectional view showing an electric driven mode of the quick-release mechanism in accordance with the preferred embodiment of the present invention.

To ensure comfortable use of the wheelchair, the chassis 1 is provided with a footrest 6 which is disposed at the front end of the chassis 1 and located between the two guide wheels 2. When sitting in the wheelchair, the user can put foot on the footrest to relax the leg muscles, so as to prevent the user from feeling numbness in legs when sitting in the wheelchair for a long time without being able to stretch out feet.

In this embodiment, the chassis 1 is further provided with two anti-tipping wheels 7 which are disposed at the rear end of the chassis 1 and located behind the two drive wheels 3. The anti-tipping wheels 7 prevent the wheelchair from tipping rearward, thus ensuring safety use of the wheelchair.

While we have shown and described various embodiments in accordance with the present invention, it is clear to those skilled in the art that further embodiments may be made without departing from the scope of the present invention.

What is claimed is:

1. An electric wheelchair with quick-release drive wheels, comprising: a chassis, and two guide wheels and two said drive wheels attached to the chassis, wherein the drive wheels are driven to rotate by a drive mechanism mounted on the chassis and connected to the drive mechanism by a quick-release mechanism, the quick-release mechanism includes a hollow shaft, and a lock nut screwed at an outer end of the hollow shaft, a shaft core is slidably disposed in the hollow shaft, a cover is screwed on an outer thread at an outer end of the shaft core, the shaft core includes a shoulder onto which a spring is disposed to push against the cover, an inner end of the shaft core is formed with an arc-shaped engaging portion in the form of a groove in which there are at least two rolling balls, the hollow shaft is formed with a positioning hole for positioning the rolling balls, the drive mechanism includes a drive shaft which is provided with an axial hole for insertion of the hollow shaft, a receiving groove for receiving the rolling balls is formed at one end of the axial hole, the drive wheel includes a hub which is provided with a shaft sleeve which is located at one of the hub adjacent to the drive mechanism, an engaging sleeve is provided at an outer end of the drive shaft, the hollow shaft is inserted through the hub and into the drive shaft in such a manner that the rolling balls project out of the positioning hole and engage in the receiving groove, so as to connect the shaft sleeve to the engaging sleeve, and as a result, the drive mechanism is able to rotate the drive wheel.

2. The electric wheelchair as claimed in claim 1, wherein the axial hole of the drive shaft is further provided with an engaging groove for engaging with the rolling balls, when the rolling balls are engaged in the engaging groove, the shaft sleeve is detached from the engaging sleeve, and the drive wheel rotates idly with respect to the drive mechanism.

3. The electric wheelchair as claimed in claim 2, wherein the shaft sleeve is provided at an end surface thereof with a plurality of equidistantly spaced engaging blocks for engaging with corresponding engaging portions formed on an end surface of the engaging sleeve, and a distance between the engaging groove and the receiving groove is larger than a thickness of the engaging blocks.

4. The electric wheelchair as claimed in claim 1, wherein the chassis is provided with a footrest which is disposed at the front end of the chassis and located between the two guide wheels.

5. The electric wheelchair as claimed in claim 1, wherein two anti-tipping wheels are disposed at the rear end of the chassis and located behind the two drive wheels.

6. The electric wheelchair as claimed in claim 1, wherein a hand wheel is fixed to an outer peripheral edge of the drive wheel.

* * * * *